United States Patent
Wei et al.

(10) Patent No.: US 9,630,849 B2
(45) Date of Patent: Apr. 25, 2017

(54) METHOD FOR TRANSFERRING CARBON NANOTUBE ARRAY AND METHOD FOR FORMING CARBON NANOTUBE STRUCTURE

(71) Applicants: Tsinghua University, Beijing (CN); HON HAI PRECISION INDUSTRY CO., LTD., New Taipei (TW)

(72) Inventors: Yang Wei, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/521,234

(22) Filed: Oct. 22, 2014

(65) Prior Publication Data

US 2015/0360948 A1 Dec. 17, 2015

(30) Foreign Application Priority Data

Jun. 13, 2014 (CN) .......................... 2014 1 0262614

(51) Int. Cl.
*B65C 9/04* (2006.01)
*B32B 37/00* (2006.01)
(Continued)

(52) U.S. Cl.
CPC ............ *C01B 31/0253* (2013.01); *B32B 1/00* (2013.01); *B32B 3/00* (2013.01); *B32B 3/02* (2013.01);
(Continued)

(58) Field of Classification Search
CPC ......... B82Y 40/00; B82Y 15/00; B82Y 10/00; H01L 51/0048; C01B 31/0226;
(Continued)

(56) References Cited

U.S. PATENT DOCUMENTS 6,340,822 B1 * 1/2002 Brown .............. H01L 23/49811
257/25
7,045,108 B2 * 5/2006 Jiang ........................ B01J 23/74
423/447.1
(Continued)

FOREIGN PATENT DOCUMENTS

CN 101239712 8/2008
CN 101506413 8/2009
(Continued)

OTHER PUBLICATIONS

Jeong et al. "JP 2005-322646, machine translation", published Nov. 17, 2005.*
(Continued)

*Primary Examiner* — Alex Efta
(74) *Attorney, Agent, or Firm* — Steven Reiss

(57) ABSTRACT

A method for transferring a carbon nanotube array is disclosed. The carbon nanotube array has an ability to have a carbon nanotube structure drawn therefrom. The carbon nanotube array is transferred from a growing substrate to a substitute substrate, meanwhile the carbon nanotube array is still configured for drawing the carbon nanotube structure from the substitute substrate. A coating layer is formed on a top end of a carbon nanotube in the carbon nanotube array. The top end is away from the growing substrate. The substitute substrate is placed on the carbon nanotube array and contacted with the coating layer. Thereby the substitute substrate is combined with the carbon nanotube array by the coating layer. The substitute substrate is separated from the growing substrate. Thereby the carbon nanotube array is separated from the growing substrate. A method for making a carbon nanotube structure is also disclosed.

16 Claims, 10 Drawing Sheets

(51) Int. Cl.
| | | |
|---|---|---|
| B32B 38/04 | (2006.01) | |
| B32B 9/00 | (2006.01) | |
| C01B 31/02 | (2006.01) | |
| B82Y 40/00 | (2011.01) | |
| B32B 37/18 | (2006.01) | |
| B32B 7/00 | (2006.01) | |
| B32B 7/04 | (2006.01) | |
| B32B 7/12 | (2006.01) | |
| B32B 9/04 | (2006.01) | |
| B32B 15/00 | (2006.01) | |
| B32B 15/04 | (2006.01) | |
| B32B 27/06 | (2006.01) | |
| B32B 27/18 | (2006.01) | |
| B32B 27/28 | (2006.01) | |
| B32B 1/00 | (2006.01) | |
| B32B 3/00 | (2006.01) | |
| B32B 3/02 | (2006.01) | |
| B32B 37/24 | (2006.01) | |
| B82Y 10/00 | (2011.01) | |
| B82Y 15/00 | (2011.01) | |

(52) U.S. Cl.
CPC .................. *B32B 7/00* (2013.01); *B32B 7/04* (2013.01); *B32B 7/12* (2013.01); *B32B 9/00* (2013.01); *B32B 9/04* (2013.01); *B32B 15/00* (2013.01); *B32B 15/04* (2013.01); *B32B 27/06* (2013.01); *B32B 27/18* (2013.01); *B32B 27/28* (2013.01); *B32B 37/025* (2013.01); *B32B 37/18* (2013.01); *B82Y 40/00* (2013.01); *B32B 37/24* (2013.01); *B32B 2037/243* (2013.01); *B32B 2255/00* (2013.01); *B32B 2264/00* (2013.01); *B32B 2264/105* (2013.01); *B32B 2307/20* (2013.01); *B32B 2307/202* (2013.01); *B32B 2307/30* (2013.01); *B32B 2307/302* (2013.01); *B32B 2313/04* (2013.01); *B32B 2457/00* (2013.01); *B32B 2457/20* (2013.01); *B32B 2457/202* (2013.01); *B82Y 10/00* (2013.01); *B82Y 15/00* (2013.01)

(58) Field of Classification Search
CPC ............ C01B 2202/00; C01B 2202/08; C01B 2202/20; B32B 2457/202; B32B 2457/20; B32B 2457/00; B32B 2313/04; B32B 2307/302; B32B 2307/30; B32B 2307/202; B32B 2307/20; B32B 2307/243; B32B 2264/105; B32B 2255/00; B32B 1/00; B32B 3/00; B32B 3/02; B32B 7/00; B32B 7/04; B32B 7/12; B32B 9/00; B32B 9/04; B32B 15/00; B32B 15/04; B32B 27/06; B32B 27/18; B32B 37/025; B32B 37/24; B32B 37/18
USPC ......... 156/235, 247; 977/734, 742, 842, 844
See application file for complete search history.

(56) References Cited

U.S. PATENT DOCUMENTS

| | | | |
|---|---|---|---|
| 7,799,163 B1 * | 9/2010 | Mau | B82Y 10/00 |
| | | | 156/230 |
| 8,048,256 B2 | 11/2011 | Feng et al. | |
| 8,068,626 B2 | 11/2011 | Jiang et al. | |
| 8,101,953 B2 | 1/2012 | Jiang et al. | |
| 8,247,036 B2 | 8/2012 | Jiang et al. | |
| 8,248,377 B2 | 8/2012 | Jiang et al. | |
| 8,269,932 B2 | 9/2012 | Fu et al. | |
| 8,864,927 B2 * | 10/2014 | Zheng | B82Y 10/00 |
| | | | 156/230 |
| 2006/0057388 A1 * | 3/2006 | Jin | B82B 3/00 |
| | | | 428/408 |
| 2007/0116957 A1 * | 5/2007 | Pan | C23C 14/18 |
| | | | 428/408 |
| 2007/0237959 A1 * | 10/2007 | Lemaire | B82Y 30/00 |
| | | | 428/408 |
| 2008/0248235 A1 | 10/2008 | Feng et al. | |
| 2010/0075024 A1 | 3/2010 | Ajayan et al. | |
| 2010/0123267 A1 | 5/2010 | Jiang et al. | |
| 2010/0170891 A1 | 7/2010 | Feng et al. | |
| 2011/0039075 A1 | 2/2011 | Feng et al. | |
| 2011/0140309 A1 | 6/2011 | Liu et al. | |
| 2011/0171419 A1 | 7/2011 | Li et al. | |
| 2011/0233816 A1 | 9/2011 | Liu | |
| 2012/0321785 A1 | 12/2012 | Rogers et al. | |
| 2013/0026679 A1 | 1/2013 | Chen et al. | |
| 2013/0142986 A1 * | 6/2013 | Christian | B29C 39/006 |
| | | | 428/95 |
| 2013/0255565 A1 | 10/2013 | Wei et al. | |

FOREIGN PATENT DOCUMENTS

| | | | |
|---|---|---|---|
| CN | 101870463 | | 10/2010 |
| CN | 101993055 | | 3/2011 |
| CN | 102598191 | | 7/2012 |
| JP | 2005322646 A | * | 11/2005 |
| TW | 200741747 | | 11/2007 |
| TW | 201020204 | | 6/2010 |
| TW | 201125042 | | 7/2011 |
| TW | 201125042 A | * | 7/2011 |
| TW | 201125814 | | 8/2011 |
| TW | 201125814 A | | 8/2011 |
| TW | 201134755 | | 10/2011 |
| TW | 201134755 A | | 10/2011 |
| TW | 201241876 | | 10/2012 |
| TW | 201339088 | | 10/2013 |

OTHER PUBLICATIONS

"Superaligned Carbon Nanotube Arrays, Films, and Yarns: A Road to Applications", Kaili Jiang et al . . . Advanced Materials, vol. 23, pp. 1154-1161.

"A stretchable carbon nanotube strain sensor for human-motion detection", Takeo Yamada et al.; nature nanotechnology; vol. 6; pp. 296-301.

"Dry-Transfer of Aligned Mul tiwalled Carbon Nanotubes for Flexible Transparent Thin Films", Journal of Nanomaterials; vol. 2012; pp. 1-8.

* cited by examiner

US 9,630,849 B2

METHOD FOR TRANSFERRING CARBON NANOTUBE ARRAY AND METHOD FOR FORMING CARBON NANOTUBE STRUCTURE

CROSS-REFERENCE TO RELATED APPLICATIONS

This application claims all benefits accruing under 35 U.S.C. §119 from China Patent Application No. 201410262614.7, filed on Jun. 13, 2014 in the China Intellectual Property Office, the contents of which are hereby incorporated by reference.

FIELD

The subject matter herein generally relates to methods for transferring carbon nanotube arrays and methods for forming carbon nanotube structures.

BACKGROUND

Carbon nanotube film can be fabricated by drawing from a carbon nanotube array grown on a growing substrate (e.g., silicon wafer), as disclosed by U.S. Pat. No. 8,048,256 to Feng et al. The carbon nanotube film is free standing and includes a plurality of carbon nanotubes joined end-to-end by van der Waals attractive force therebetween. The carbon nanotubes in the carbon nanotube film are substantially aligned along the lengthwise direction of the carbon nanotube film, and thus, the carbon nanotube film has good thermal and electrical conductivity along the direction of the aligned carbon nanotubes. The carbon nanotube film is substantially transparent and can be used as a conductive thin film. Therefore, the carbon nanotube film can be used in many different fields, such as touch panels, liquid crystal displays, speakers, heating devices, thin film transistors, cables, and the like.

BRIEF DESCRIPTION OF THE DRAWINGS

Implementations of the present technology will now be described, by way of example only, with reference to the attached figures, wherein.

DETAILED DESCRIPTION

Figure 1:
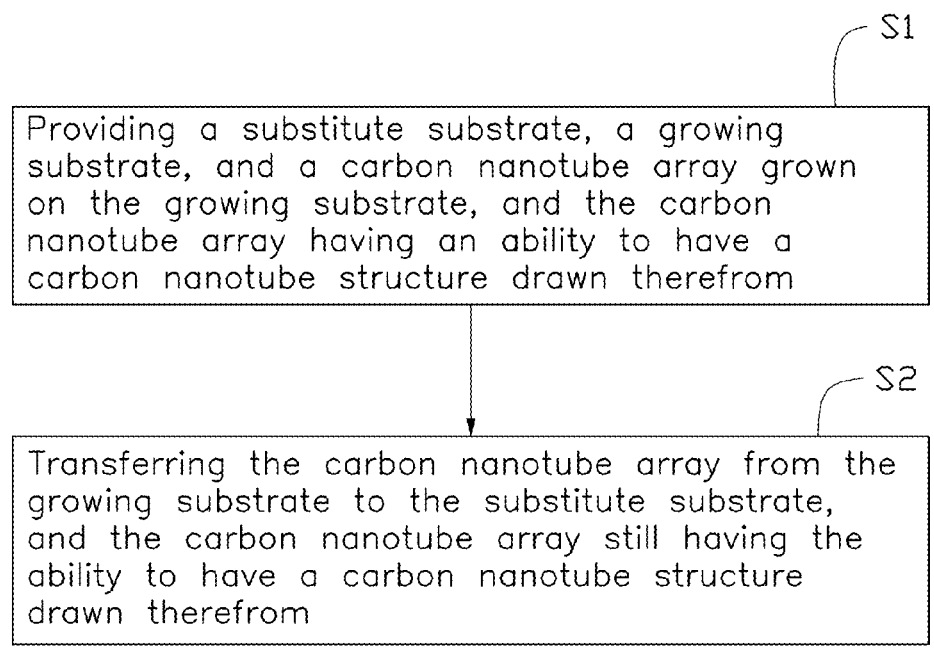
FIG. 1 is a flow chart of an embodiment of a method for transferring a carbon nanotube array.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "contact" is defined as a direct and physical contact. The term "substantially" is defined to be essentially conforming to the particular dimension, shape, or other description that is described, such that the component need not be exactly conforming to the description. The term "comprising," when utilized, means "including, but not necessarily limited to"; it specifically indicates open-ended inclusion or membership in the so-described combination, group, series, and the like.

Figure 2:
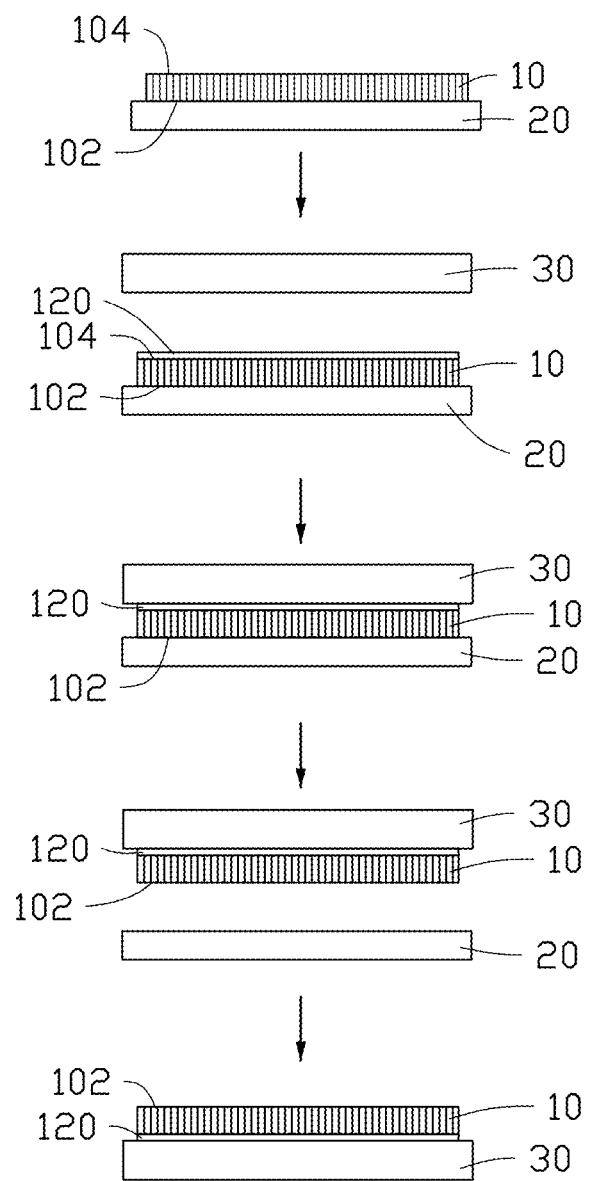
FIG. 2 is a schematic structural view of an embodiment of the method for transferring the carbon nanotube array.

Referring to FIG. 1 and FIG. 2, the present disclosure is described in relation to a method for transferring a carbon nanotube array 10.

In block S1, a substitute substrate 30 and a growing substrate 20 are provided. The growing substrate 20 has a carbon nanotube array 10 grown thereon, and the carbon nanotube array 10 is in a state that is capable of having the carbon nanotube structure 40 drawn therefrom. The carbon nanotube array 10 comprises a bottom surface 102 adjacent to the growing substrate 20 and a top surface 104 away from the growing substrate 20.

In block S2, the carbon nanotube array 10 is transferred from the growing substrate 20 onto the substitute substrate 30. The state of the carbon nanotube array 10 before, during, and after the transfer onto the substitute substrate 30 is still capable of having the carbon nanotube structure 40 drawn therefrom.

The carbon nanotube structure 40 can be a free-standing structure including a plurality of carbon nanotubes joined end-to-end by van der Waals attractive force therebetween. The carbon nanotube structure 40 can be a carbon nanotube film or a carbon nanotube wire.

The carbon nanotube array 10 is grown on the growing substrate 20 by a chemical vapor deposition (CVD) method. The carbon nanotube array 10 comprises a plurality of carbon nanotubes oriented substantially perpendicular to a growing surface of the growing substrate 20. The carbon nanotubes in the carbon nanotube array 10 are closely bonded together side-by-side by van der Waals attractive forces. By controlling growing conditions, the carbon nanotube array 10 can be essentially free of impurities such as carbonaceous or residual catalyst particles. Accordingly, the carbon nanotubes in the carbon nanotube array 10 are closely contacting each other, and a relatively large van der Waals attractive force exists between adjacent carbon nanotubes. The van der Waals attractive force is so large that when drawing a carbon nanotube segment (e.g., a few carbon nanotubes arranged side-by-side), adjacent carbon nanotube segments can be drawn out end-to-end from the carbon nanotube array 10 due to the van der Waals attractive forces between the carbon nanotubes. The carbon nanotubes are continuously drawn to form a free-standing and macroscopic carbon nanotube structure 40, which can be in the shape of a film or a wire. The carbon nanotube array 10 that can have the carbon nanotube structure 40 drawn therefrom can be a super aligned carbon nanotube array. A material of the growing substrate 20 can be P-type silicon, N-type silicon, or other materials that are suitable for growing the super aligned carbon nanotube array.

The carbon nanotube structure 40 drawn from the carbon nanotube array 10 comprises a plurality of carbon nanotubes joined end-to-end and can be a free-standing carbon nanotube film. The carbon nanotube film comprises a plurality of carbon nanotubes substantially aligned along the same direction.

Figure 3:
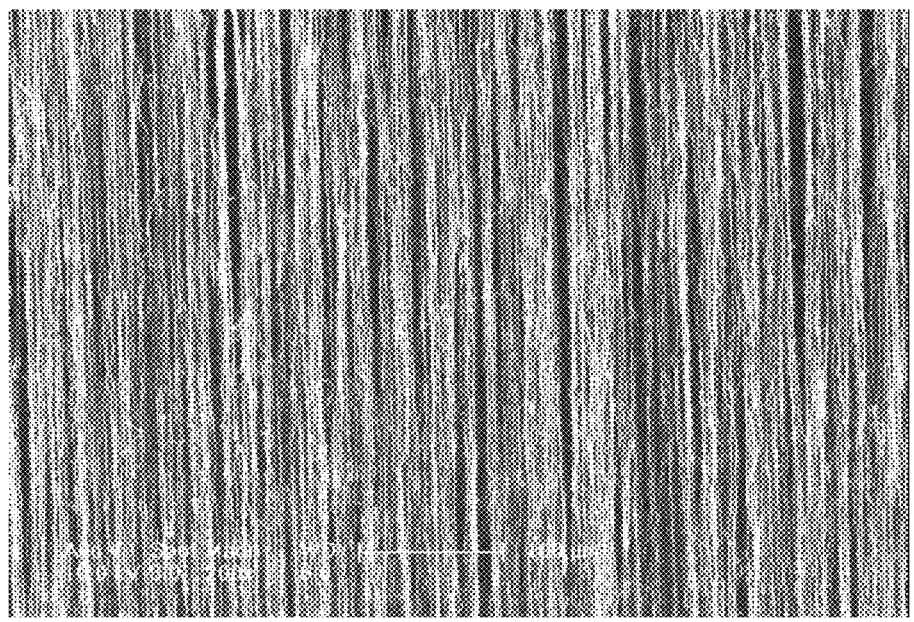
FIG. 3 shows a scanning electron microscope (SEM) image of a carbon nanotube film drawn from the carbon nanotube array.
Figure 4:
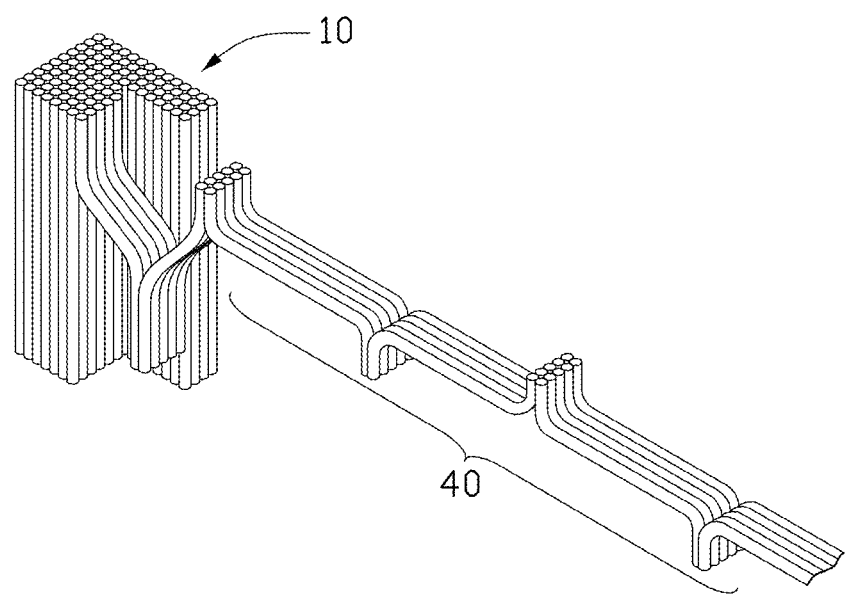
FIG. 4 shows carbon nanotubes joined end-to-end.

Referring to FIG. 3 and FIG. 4, the carbon nanotube film can comprise or consist of a plurality of carbon nanotubes. In the carbon nanotube film, the overall aligned direction of a majority of the carbon nanotubes is substantially aligned along the same direction parallel to a surface of the carbon nanotube film. A majority of the carbon nanotubes are substantially aligned along the same direction in the carbon nanotube film. Along the aligned direction of the majority of carbon nanotubes, each carbon nanotube is joined to adjacent carbon nanotubes end to end by van der Waals attractive force therebetween, whereby the carbon nanotube film is capable of being free-standing structure. There may be a minority of carbon nanotubes in the carbon nanotube film that are randomly aligned. However, the number of the randomly aligned carbon nanotubes is very small and does not affect the overall oriented alignment of the majority of carbon nanotubes in the carbon nanotube film. Some of the majority of the carbon nanotubes in the carbon nanotube film that are substantially aligned along the same direction may not be exactly straight, and can be curved at a certain degree, or not exactly aligned along the overall aligned direction by a certain degree. Therefore, partial contacts can exist between the juxtaposed carbon nanotubes in the majority of the carbon nanotubes aligned along the same direction in the carbon nanotube film. The carbon nanotube film can comprise a plurality of successive and oriented carbon nanotube segments. The plurality of carbon nanotube segments are joined end to end by van der Waals attractive force. Each carbon nanotube segment comprises a plurality of carbon nanotubes substantially parallel to each other, and the plurality of paralleled carbon nanotubes are in contact with each other and combined by van der Waals attractive force therebetween. The carbon nanotube segment has a desired length, thickness, uniformity, and shape. There can be clearances between adjacent and juxtaposed carbon nanotubes in the carbon nanotube film. A thickness of the carbon nanotube film at the thickest location is about 0.5 nanometers to about 100 microns (e.g., in a range from 0.5 nanometers to about 10 microns). When the carbon nanotube structure 40 has a small width, the carbon nanotube structure 40 can be a free-standing carbon nanotube wire.

The term "free-standing" comprises, but is not limited to, a structure that does not need to be supported by a substrate. For example, a free-standing carbon nanotube structure 40 can sustain the weight of itself when it is hoisted by a portion thereof without any significant damage to its structural integrity. If the free-standing carbon nanotube structure 40 is placed between two separate supporters, a portion of the free-standing carbon nanotube structure 40 suspended between the two supporters can maintain structural integrity. The free-standing carbon nanotube structure 40 can be realized by the successive carbon nanotubes joined end to end by van der Waals attractive force.

In the present disclosure, the growing of the carbon nanotube array 10 and the drawing of the carbon nanotube structure 40 are processed on different substrates (i.e., the growing substrate 20 and the substitute substrate 30). The substitute substrate 30 for drawing the carbon nanotube structure 40 can be made of low-price materials, and the growing substrate 20 can be recycled quickly. Thus, production of the carbon nanotube structure 40 can be optimized.

The substitute substrate 30 can be a soft, elastic, or rigid solid substrate. The substitute substrate 30 has a surface 302 to accept the carbon nanotube array 10 thereon. During transferring of the carbon nanotube array 10 from the growing substrate 20 to the substitute substrate 30, the state of the carbon nanotube array 10 is still capable of drawing the carbon nanotube structure 40 from the carbon nanotube array 10 on the substitute substrate 30. That is, the carbon nanotube array 10 transferred to the substitute substrate 30 is still a super aligned carbon nanotube array.

Figure 5:
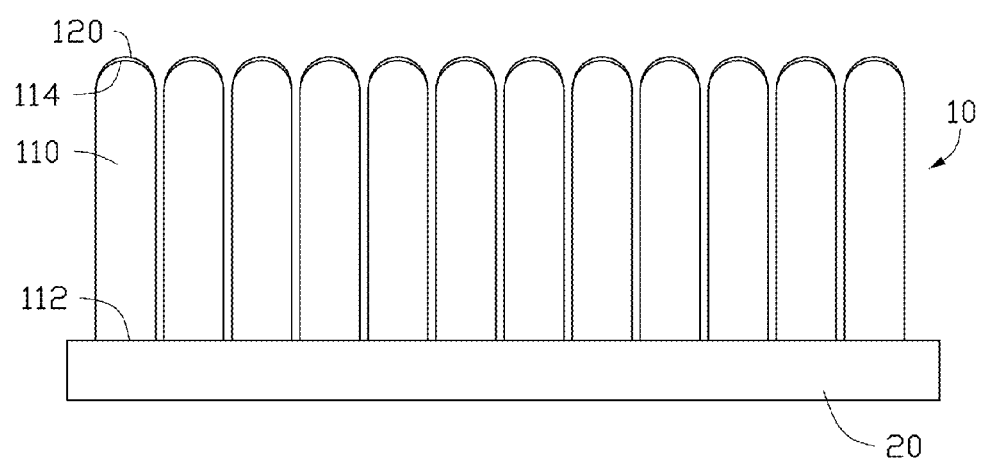
FIG. 5 is a schematic structural view of an embodiment of the carbon nanotube array having carbon nanotubes coated with coating layers.

The carbon nanotube array 10 is arranged upside down on the surface 302 of the substitute substrate 30. Referring to FIG. 5, the carbon nanotubes 110 are grown from the growing surface 202 of the growing substrate 20 to form the carbon nanotube array 10. The carbon nanotube 110 comprises a bottom end 112 adjacent or contacting the growing surface 202 of the growing substrate 20 and a top end 114 away from the growing surface 202 of the growing substrate 20. The bottom ends 112 of the carbon nanotubes 110 form the bottom surface 102 of the carbon nanotube array 10, and the top ends 114 of the carbon nanotubes 110 form the top surface 104 of the carbon nanotube array 10. After the carbon nanotube array 10 is transferred to the substitute substrate 30, the top surface 104 of the carbon nanotube array 10 is now adjacent to or contacting the surface 302 of the substitute substrate 30, and the bottom surface 102 of the carbon nanotube array 10 is now away from the substitute substrate 30.

Figure 10:
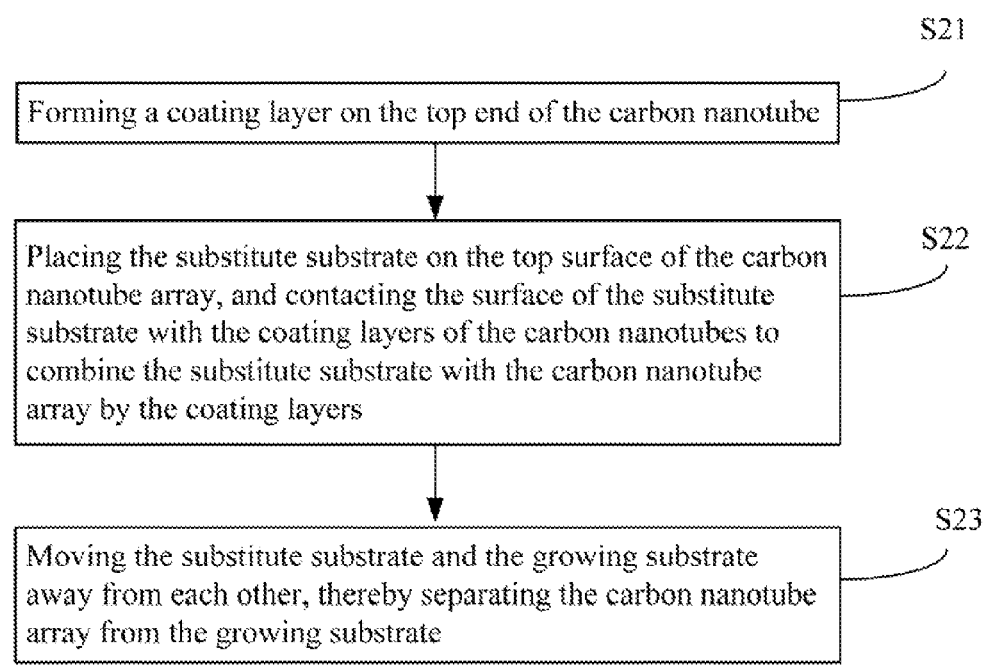
FIG. 10 shows a flow chart of one embodiment of block 2 in the method for transferring the carbon nanotube array.

Referring to FIG. 10, in block S2, the carbon nanotube array 10 can be transferred from the growing substrate 20 to the substitute substrate 30 at room temperature (e.g., 10° C. to 40° C.). Block S2 can comprise blocks S21, S22, and S23.

In block S21, a coating layer 120 is formed on the top end 114 of the carbon nanotube 110. Most of or substantially all carbon nanotubes 110 in the carbon nanotube array 10 have the coating layer 120 coated on the top end 114. The coating layers 120 are coated on individual top ends 114 of the carbon nanotubes 110. The coating layers 120 on different carbon nanotubes 110 are separated from each other. A force ($F_{DD}$) between the adjacent coating layers 120 is small.

In block S22, the substitute substrate 30 is placed on the top surface 104 of the carbon nanotube array 10, and the surface 302 of the substitute substrate 30 is contacted with the coating layers 120 of the carbon nanotubes 110 to combine the substitute substrate 30 with the carbon nanotube array 10 by the coating layers 120.

In block S23, the substitute substrate 30 and the growing substrate 20 are moved away from each other, thereby separating the carbon nanotube array 10 from the growing substrate 20.

The surface 302 of the substitute substrate 30 and the top surface 104 of the carbon nanotube array 10 can be bonded, a bonding force ($F_{BC}$) between the carbon nanotube array 10 and the substitute substrate 30 should be larger than a bonding force ($F_{AC}$) between the carbon nanotube array 10 and the growing substrate 20. Thus, during the moving step in block S23, the carbon nanotube array 10 can be separated from the growing substrate 20, and meanwhile the carbon nanotube array 10 is still bonded with the substitute substrate 30, thus transferred to the substitute substrate 30. That is, $F_{AC} < F_{BC}$. On the other hand, to ensure that the carbon nanotube array 10 transferred to the substitute substrate 30 is still capable of having the carbon nanotube structure 40 drawn therefrom, $F_{BC}$ should be smaller than the van der Waals attractive forces ($F_{CC}$) between the carbon nanotubes in the carbon nanotube array 10. That is, $F_{BC} < F_{CC}$.

Therefore, $F_{AC} < F_{BC} < F_{CC}$ should be satisfied.

However, if simply the bare top ends 114 make contact with the surface of the substitute substrate 30, the attractive force (e.g., van der Waals forces) formed therebetween due to the contacting is small. The coating layer 120 is introduced to increase the bonding force ($F_{BC}$) between the carbon nanotube array 10 and the substitute substrate 30. The coating layer 120 can be previously formed on the top end 114 of the carbon nanotube 110 before placing the substitute substrate 30 on the top surface 104 of the carbon nanotube array 10. The material of the coating layer 120 can be selected from the materials that have relatively large attractive force to the substitute substrate 30 due to a surface energy that the material of the coating layer 120 have and an interface energy that between the surface 302 and the coating layer 120. That is, a bonding force ($F_{BD}$) between the coating layer 120 and the surface 302 of the substitute substrate 30 should satisfies $F_{AC} < F_{BD} < F_{CC}$. The coating layer 120 can be firmly combined with the top end 114 of the carbon nanotube 110. The material of the coating layer 120 can be metals or inorganic materials. The metals can be selected from at least one of iron, cobalt, nickel, palladium, titanium, copper, silver, and gold. The inorganic materials can be selected from at least one of aluminum oxide ($Al_2O_3$), nickel oxide (NiO), titanium dioxide ($TiO_2$), copper oxide (CuO), silver oxide ($Ag_2O$), cobalt oxide ($Co_3O_4$), and iron oxide ($Fe_3O_4$). The coating layer 120 is a solid layer. The thickness of the coating layer 120 is in nano size, such as about 1 nanometer~20 nanometers. In one embodiment, the thickness of the coating layer 120 is in a range from about 1 nanometer to 10 nanometers.

The material of the coating layer 120 is not a conventional adhesive binder. The van der Waals attractive force ($F_{CC}$) between the carbon nanotubes in the carbon nanotube array 10 is very small. Thus, almost all the conventional adhesive binder, especially the organic polymer, causes $F_{BC} > F_{CC}$, which is unsatisfactory for drawing the carbon nanotube structure 40 from the transferred carbon nanotube array 10 on the substitute substrate 30.

The force ($F_{DD}$) between the adjacent coating layers 120 is not larger than the van der Waals attractive force ($F_{CC}$) between the carbon nanotubes in the carbon nanotube array 10. The coating layers 120 on different carbon nanotubes 110 do not form an integrated structure.

In block S21, the coating layer 120 can be formed on the top end 114 of the carbon nanotube 110 by a depositing method (PVD or CVD), a vacuum evaporation method, or a sputtering method. In one embodiment, the coating layer 120 is a nickel layer having a thickness of about 2 nanometers.

In block S22, due to the contacting, the surface 302 of the substitute substrate 30 is combined with the coating layer 120 only by van der Waals attractive force.

To satisfy $F_{AC} < F_{BC} < F_{CC}$, the surface 302 of the substitute substrate 30 can have a suitable surface energy, and a suitable interface energy can exist between the substitute substrate 30 and the carbon nanotube array 10. Thus, the substitute substrate 30 can generate enough bonding force (e.g., van der Waals attractive force) with the coating layer 120 simply by contacting to the coating layer 120. A suitable material of the substitute substrate 30 must have a sufficient bonding force $F_{BC}$ (e.g., van der Waals attractive force) with the coating layer 120 to overcome the bonding force $F_{AC}$ between the carbon nanotube array 10 and the growing substrate 20. The surface 302 of the substitute substrate 30 can be substantially flat. The material of the substitute substrate 30 is not limited and can be at least one of metal, glass, crystal, ceramic, silicon, silicon dioxide, plastic, and resin, such as polymethyl methacrylate (PMMA), polyethylene terephthalate (PET), and poly(dimethylsiloxane) (PDMS).

During the entire transferring of the carbon nanotube array 10 from the growing substrate 20 to the substitute substrate 30 in block S22 to S23, the substitute substrate 30 is always in solid state. The block S22 to S23 is at room temperature.

Figure 6:
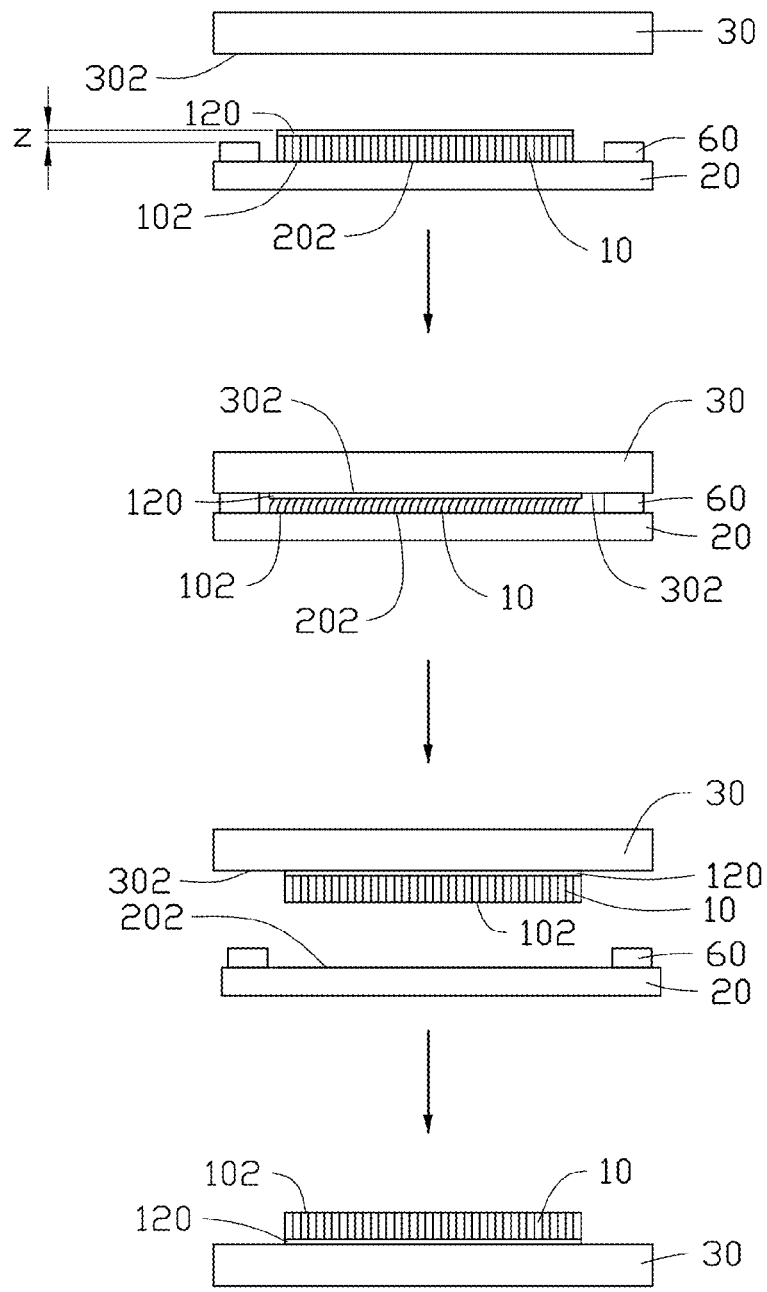
FIG. 6 is a schematic structural view of another embodiment of the method for transferring the carbon nanotube array.

Referring to FIG. 6, in block S22, to ensure almost all the coating layers 120 on the top ends 114 of the carbon nanotubes 110 in the carbon nanotube array 10 have sufficient contact with the surface 302 of the substitute substrate 30, the substitute substrate 30 and the growing substrate 20 can be brought close enough. A distance from the surface 302 of the substitute substrate 30 to the surface 202 of the growing substrate 20 can be less than or equal to the height of the carbon nanotube array 10 to apply a pressing force (f) to the carbon nanotube array 10. The pressing force f cannot be too large to ensure the state of the carbon nanotube array 10 is still capable of drawing the carbon nanotube structure 40 when transferred to the substitute substrate 30. The pressing force is not to press the carbon nanotubes 110 down or vary the length direction of the carbon nanotubes 110 in the carbon nanotube array 10, otherwise the state of the carbon nanotube array 10 could change. Thus, the distance between the surface 302 of the substitute substrate 30 and the surface 202 of the growing substrate 20 cannot be too small and should be larger than an extreme value. The extreme value is a value that causes the state of the carbon nanotube array 10 to be unable to draw the carbon nanotube structure 40 therefrom.

However, the pressing force is difficult to control, and the height of the carbon nanotube array 10 is often in tens of microns to hundreds of microns. If the pressing force is too large, the carbon nanotubes in the array 10 may be pressed down. In one embodiment, a spacing element 60 is provided. The substitute substrate 30 is spaced from the growing substrate 20 by the spacing element 60. The spacing element 60 is used to limit the distance between the surface 302 of the substitute substrate 30 and the surface 202 of the growing substrate 20. The height of the spacing element 22 located between the substitute substrate 30 and the growing substrate 20 is smaller than or equal to the height of the carbon nanotube array 10 and larger than the extreme value. A height difference (z) between the spacing element 60 and the carbon nanotube array 10 can exist. The spacing element 60 is a solid member. In one embodiment, the spacing element 60 is rigid. By controlling the height of the spacing element 60, the distance between the substitute substrate 30 and the growing substrate 20 can be precisely controlled. The height (m) of the spacing element 60 can be 0.9 times to 1 time of the height (n) of the carbon nanotube array 10 (i.e., m=0.9n to n).

During the pressing of the carbon nanotube array 10, the carbon nanotubes in the carbon nanotube array 10 are still substantially perpendicular to the growing surface of the growing substrate 20. When the height (m) is smaller than the height (n), the carbon nanotubes in the carbon nanotube array 10 can be pressed to be curved slightly. However, the curve is small and when the substitute substrate 30 and the growing substrate 20 are separated, the carbon nanotubes can restore the straight shape and the carbon nanotube array 10 can restore the original height. Thus, the state of the carbon nanotube array 10 is still kept to be capable of having the carbon nanotube film drawn from the carbon nanotube array 10.

In one embodiment, the spacing element 60 is arranged on the growing substrate 20. In another embodiment, the spacing element 60 is arranged on the substitute substrate 30. In yet another embodiment, the spacing element 60 can be a part of the growing substrate 20 or the substitute substrate 30. A shape of the spacing element 60 is not limited and can be a block, a piece, a column, or a ball. There can be a plurality of spacing elements 60 uniformly arranged around the carbon nanotube array 10. The spacing element 60 can be a round circle around the carbon nanotube array 10. In another embodiment, the spacing elements 60 are a plurality of round columns uniformly arranged around the carbon nanotube array 10.

Figure 7:
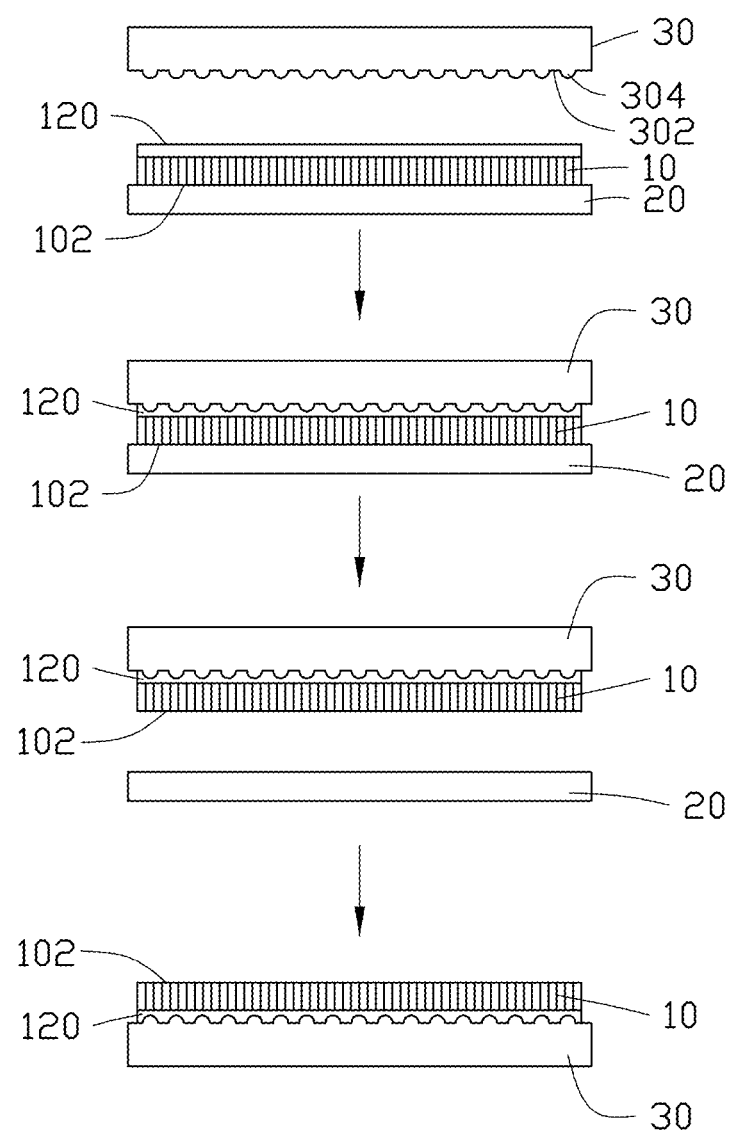
FIG. 7 is a schematic structural view of yet another embodiment of the method for transferring the carbon nanotube array.
Figure 8:
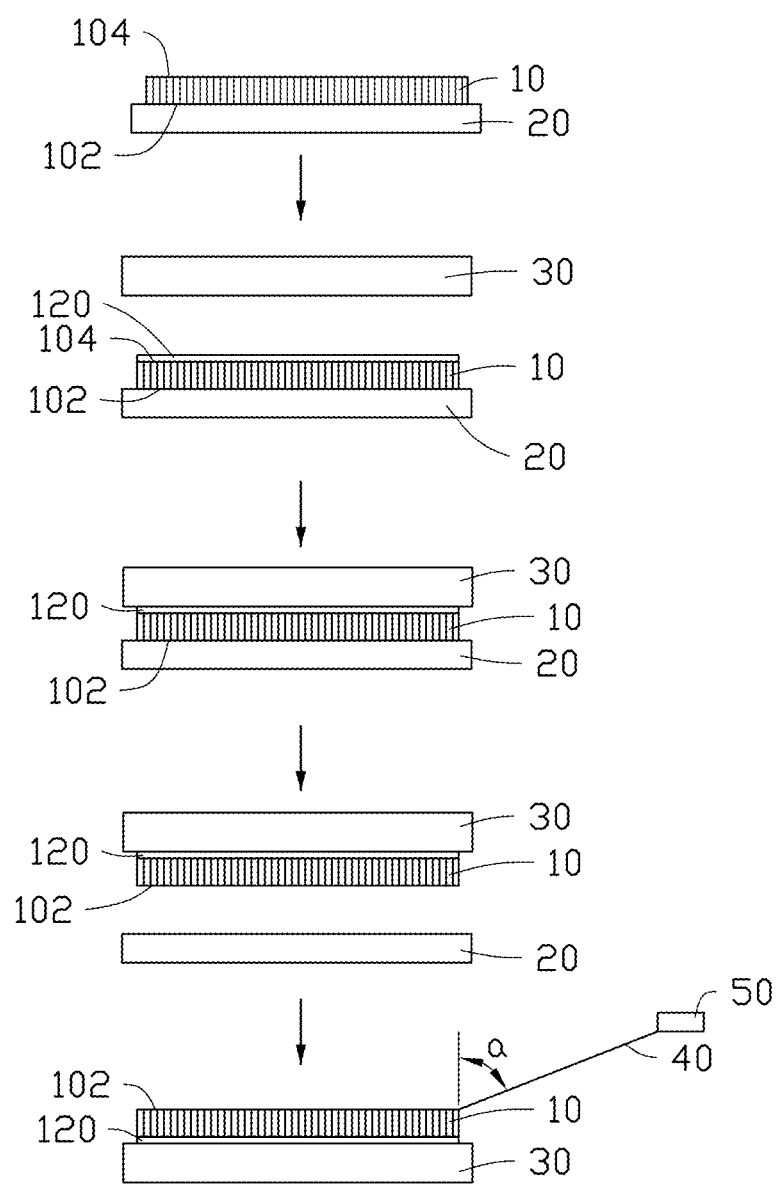
FIG. 8 is a schematic structural view of an embodiment of a method for forming a carbon nanotube structure.
Figure 9:
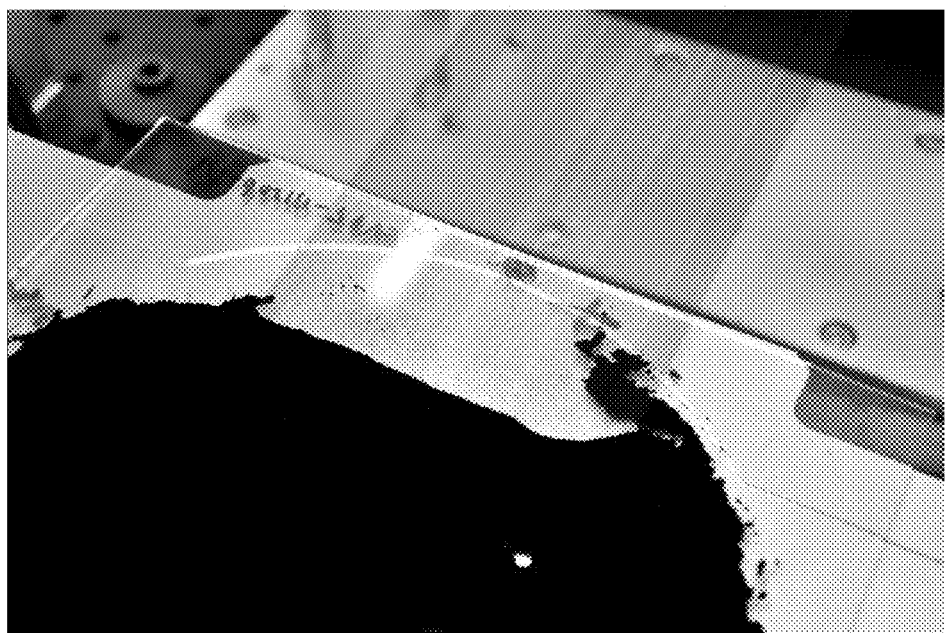
FIG. 9 shows an optical photo of drawing the carbon nanotube film from the carbon nanotube array transferred to a substitute substrate.

Referring to FIG. 7, in another embodiment, to satisfy $F_{AC} < F_{BC} < F_{CC}$, the substitute substrate 30 can increase the surface area of the surface 302 by using the microstructures 304, thus increasing the $F_{BC}$. The substitute substrate 30 can have the surface 302 with a plurality of microstructures 304 located thereon. The microstructure 304 can have a point shape and/or a long and narrow shape, and can be protrusions and/or recesses. The cross section of the microstructures 304 can be semicircular, rectangular, conical, and/or stepped. The microstructures 304 can be hemi-spheres, convex or concave columns, pyramids, pyramids without tips, and any combination thereof. In one embodiment, the microstructures 304 can be parallel and spaced grooves. In another embodiment, the microstructures 304 can be uniformly spaced hemispherical protrusions. The plurality of microstructures 304 are uniformly distributed on the surface 302 of the substitute substrate 30. In one embodiment, the surface 302 having the microstructures 304 located thereon has a surface area of 30% to 120% more than a smooth surface. The surface 302 sufficiently contacts the top surface 104 of the carbon nanotube array 10.

The height of the protrusion and the depth of the recess of the microstructures 304 can be 0.5% to 10% of the height of the carbon nanotube array 10. In one embodiment, the height of the protrusion and the depth of the recess can be in a range from about 5 microns to about 50 microns. The surface 302 needs an overall flatness to sufficiently contact the top surface 104 of the carbon nanotube array 10. The microstructures 304 can be formed on the surface 302 by laser etching, chemical etching, or lithography.

The microstructures 304 make the surface 302 of the substitute substrate 30 rough. When the recessed portion of the surface 302 is in contact with the top surface 104 of the carbon nanotube array 10, the protruded portion of the surface 302 may slightly curve the carbon nanotubes contacting the protruded portion. However, the microstructures 304 are small, so the curve is small, and when the substitute substrate 30 and the growing substrate 20 are separated, the carbon nanotubes can elastically restore to a substantially straight shape and the carbon nanotube array 10 can restore to its original height. Thus, the state of the carbon nanotube array 10 is still capable of having the carbon nanotube structure 40 drawn from the carbon nanotube array 10.

In block S23, due to the bonding between the carbon nanotube array 10 and the substitute substrate 30 by the coating layer 120, the separating of the two substrates can separate the carbon nanotube array 10 from the growing substrate 20. During the separating, a majority of the carbon nanotubes in the carbon nanotube array 10 can be detached from the growing substrate 20 at the same time by moving either the substitute substrate 30 or the growing substrate 20, or both, away from each other along a direction substantially perpendicular to the growing surface of the growing substrate 20. The carbon nanotubes of the carbon nanotube array 10 are detached from the growing substrate 20 along the growing direction of the carbon nanotubes. When both the substitute substrate 30 and the growing substrate 20 separate, the two substrates both moves along the direction perpendicular to the growing surface of the growing substrate 20 and depart from each other.

The state of the carbon nanotube array 10, before, during, and after the transfer onto the substitute substrate 30, and after the removal of the coating layer 120, is still capable of having the carbon nanotube structure 40 drawn therefrom.

Referring to FIG. 7, the present disclosure is described in relation to a method for forming a carbon nanotube structure 40 including the previously described blocks S1 to S2, and further including block S3. In block S3, the carbon nanotube structure 40 is drawn from the carbon nanotube array 10 on the substitute substrate 30.

Referring to FIG. 7, in the block S3, the carbon nanotube structure 40 is drawn from the carbon nanotube array 10 that was transferred to the substitute substrate 30, not from the carbon nanotube array 10 located on the growing substrate 20. In one embodiment of block S3, the carbon nanotube structure 40 can be drawn from the carbon nanotube array 10 upside down on the surface of the substitute substrate 30 (i.e., drawn from the bottom surface 102 of the carbon nanotube array 10).

Block S3 can comprise block S31 and S32:

In block S31, a carbon nanotube segment having a predetermined width is drawn from the carbon nanotube array 10 on the substitute substrate 30. The segment is selected using a drawing tool 50 (e.g., adhesive tape, pliers, tweezers, or other tool allowing multiple carbon nanotubes to be gripped and pulled simultaneously).

In block S32, a plurality of carbon nanotube segments joined end to end by van der Waals attractive force is drawn by moving the drawing tool 50, thereby forming a continuous carbon nanotube structure 40.

In block S31, the carbon nanotube segment comprises a single carbon nanotube or a plurality of carbon nanotubes substantially parallel to each other. The drawing tool 50 such as adhesive tape can be used for selecting and drawing the carbon nanotube segment. The adhesive tape may contact with the carbon nanotubes in the carbon nanotube array to select the carbon nanotube segment. The drawing tool 50 can select a large width of carbon nanotube segments to form the carbon nanotube film, or a small width of the carbon nanotube segments to form the carbon nanotube wire.

In block S32, an angle between a drawing direction of the carbon nanotube segments and the growing direction of the carbon nanotubes in the carbon nanotube array 10 can be larger than 0 degrees (e.g., 30° to 90°).

Block S22 is different from block S3. The purpose of block S22 is to separate the carbon nanotube array 10 as a whole from the growing substrate 20. The carbon nanotube array 10 separated from the growing substrate 20 still in the array shape. The purpose of block S3 is to draw out carbon nanotubes one by one or segment by segment to form a carbon nanotube film or wire from the carbon nanotube array 10 on the substitute substrate 30.

In one embodiment of a method for making the carbon nanotube structure 40, the growing of the carbon nanotube array 10 and the drawing of the carbon nanotube structure 40 can be processed on different substrates. The substitute substrate 30 can be made of cheap material, and the expensive growing substrate 20 can be recycled quickly and used again for growing new carbon nanotube arrays 10, thus speeding up the production of the carbon nanotube arrays.

Depending on the embodiment, certain of the blocks of the methods described may be removed, others may be added, and the sequence of blocks may be altered. It is also to be understood that the description and the claims drawn to a method may comprise some indication in reference to certain blocks. However, the indication used is only to be viewed for identification purposes and not as a suggestion as to an order for the blocks.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A method for transferring a carbon nanotube array, the method comprising:

providing a substitute substrate, a growing substrate, and a carbon nanotube array grown on the growing substrate, the carbon nanotube array comprising a plurality of carbon nanotubes oriented substantially perpendicular to a growing surface of the growing substrate, and having an ability to have a carbon nanotube structure drawn therefrom, and the carbon nanotube structure comprises the plurality of carbon nanotubes joined end to end;

transferring the carbon nanotube array from the growing substrate to the substitute substrate such that the carbon nanotube array still has the ability to have the carbon nanotube structure drawn therefrom, comprising:

forming a coating layer on a top end of a carbon nanotube in the carbon nanotube array, the top end is away from the growing substrate;

placing the substitute substrate on the carbon nanotube array and contacting the substitute substrate with the coating layer, thereby combining the substitute substrate with the carbon nanotube array by the coating layer, and the coating layer is combined with the substitute substrate only by van der Waals attractive force; and separating the substitute substrate from the growing substrate, thereby separating the carbon nanotube array from the growing substrate.

2. The method of claim 1, wherein the carbon nanotube structure is a carbon nanotube film or a carbon nanotube wire.

3. The method of claim 1, wherein a bonding force ($F_{BD}$) between the coating layer and the substitute substrate satisfies $F_{AC} < F_{BD} < F_{CC}$; wherein $F_{CC}$ is van der Waals attractive forces between the plurality of carbon nanotubes in the carbon nanotube array, and $F_{AC}$ is a bonding force between the carbon nanotube array and the growing substrate.

4. The method of claim 1, wherein a material of the coating layer is metal or inorganic material.

5. The method of claim 4, wherein the metal is selected from the group consisting of iron, cobalt, nickel, palladium, titanium, copper, silver, gold, and combinations thereof, the inorganic material is selected from the group consisting of aluminum oxide, nickel oxide, titanium dioxide, copper oxide, silver oxide, cobalt oxide, and iron oxide.

6. The method of claim 1, wherein a thickness of the coating layer is in a range form about 1 nanometer to about 20 nanometers.

7. The method of claim 1, wherein the coating layer is formed by depositing, vacuum evaporating, or sputtering.

8. The method of claim 1, wherein a surface of the substitute substrate has a plurality of microstructures located thereon.

9. The method of claim 1, wherein the substitute substrate is spaced from the growing substrate by a spacing element, the spacing element has a height between the substitute substrate and the growing substrate less than or equal to the height of the carbon nanotube array.

10. The method of claim 1, wherein during the separating the carbon nanotube array from the growing substrate, substantially all the plurality of carbon nanotubes in the carbon nanotube array are simultaneously detached from the growing substrate.

11. The method of claim 1, wherein a moving direction of at least one of the substitute substrate and the growing substrate is substantially perpendicular to the growing surface of the growing substrate during the separating of the at least one of the substitute substrate and the growing substrate.

12. A method for forming a carbon nanotube structure, the method comprising:

providing a substitute substrate, a growing substrate, and a carbon nanotube array grown on the growing substrate, the carbon nanotube array comprising a plurality of carbon nanotubes oriented substantially perpendicular to a growing surface of the growing substrate, and having an ability to have a carbon nanotube structure drawn therefrom, and the carbon nanotube structure comprises the plurality of carbon nanotubes joined end to end;

transferring the carbon nanotube array from the growing substrate to the substitute substrate such that the carbon nanotube array still has the ability to have the carbon nanotube structure drawn therefrom, comprising:

forming a coating layer on a top end of the plurality of carbon nanotubes in the carbon nanotube array, the top end is away from the growing substrate;

placing the substitute substrate on the carbon nanotube array and contacting the substitute substrate with the coating layer, thereby combining the substitute substrate with the carbon nanotube array by the coating layer, and the coating layer is combined with the substitute substrate only by van der Waals attractive force; and separating the substitute substrate from the growing substrate, thereby separating the carbon nanotube array from the growing substrate; and drawing the carbon nanotube structure from the carbon nanotube array on the substitute substrate.

13. A method for forming a carbon nanotube structure, the method comprising:

providing a first substrate, a second substrate, the carbon nanotube array comprising a plurality of carbon nanotubes oriented substantially perpendicular to a growing surface of the growing substrate, and having an ability to have a carbon nanotube structure drawn therefrom, and the carbon nanotube structure comprises the plurality of carbon nanotubes joined end to end;

transferring the carbon nanotube array from the first substrate to the second substrate such that the carbon nanotube array still has the ability to have the carbon nanotube structure drawn therefrom, comprising:

forming a coating layer on a top end of the plurality of carbon nanotubes in the carbon nanotube array, the top end is away from the first substrate;

placing the second substrate on the carbon nanotube array and contacting the second substrate with the coating layer, thereby combining the second substrate with the carbon nanotube array by the coating layer, and the coating layer is combined with the substitute substrate only by van der Waals attractive force; and separating the second substrate from the first substrate, thereby separating the carbon nanotube array from the first substrate; and drawing the carbon nanotube structure from the carbon nanotube array on the second substrate.

14. The method of claim 1, wherein the substitute substrate comprises a receiving surface, during the step of placing the substitute substrate on the carbon nanotube array and contacting the substitute substrate with the coating layer, a distance from the receiving surface of the substitute substrate to the growing surface of the growing substrate is less than or equal to the height of the carbon nanotube array to apply a pressing force to the carbon nanotube array.

15. The method of claim 14, wherein during the pressing of the carbon nanotube array, the plurality of carbon nanotubes in the carbon nanotube array is still substantially perpendicular to the growing surface of the growing substrate.

16. The method of claim 1, wherein after transferring the carbon nanotube array from the growing substrate to the substitute substrate, the carbon nanotube array is located on the substitute substrate, and the plurality of carbon nanotubes in the carbon nanotube array is substantially perpendicular with a receiving surface of the substitute substrate.

* * * * *